US005397930A

United States Patent [19]

Nilssen

[11] Patent Number: 5,397,930

[45] Date of Patent: Mar. 14, 1995

[54] PROGRAMMABLE WALL SWITCH PLUG-IN TIMER

[76] Inventor: Ole K. Nilssen, Caesar Dr. Rte. 5, Barrington, Ill. 60010

[21] Appl. No.: 160,326

[22] Filed: Dec. 2, 1993

Related U.S. Application Data

[63] Continuation of Ser. No. 420,695, Oct. 11, 1989, abandoned, which is a continuation of Ser. No. 728,678, Apr. 29, 1985, abandoned.

[51] Int. Cl.$^6$ ........................ H02J 7/00; H05B 37/02; H01H 7/08

[52] U.S. Cl. .................................... 307/150; 307/140; 307/141.4; 200/38 R; 200/38 B; 200/38 D; 315/360

[58] Field of Search ...................... 307/140, 141.4, 150, 307/139; 200/35 R, 38 R, 38 B, 38 D; 315/360

[56] References Cited

U.S. PATENT DOCUMENTS

| | | | |
|---|---|---|---|
| 3,548,125 | 12/1970 | Banathy et al. | 200/38 D |
| 3,740,680 | 6/1973 | Schneidinger | 335/59 |
| 3,889,132 | 6/1975 | Vreeland | 200/33 R X |
| 3,925,629 | 12/1975 | Albinger, Jr. | 200/38 R |
| 3,973,251 | 8/1976 | Stephas | 200/38 B X |
| 4,001,527 | 1/1977 | Hulshizer | 200/38 D X |
| 4,112,313 | 9/1978 | Kutin | 307/141 |
| 4,145,617 | 3/1979 | Lee et al. | 368/204 |
| 4,259,618 | 3/1981 | Nilssen | 307/140 X |
| 4,302,639 | 11/1981 | Lewis et al. | 200/38 R |
| 4,360,739 | 11/1982 | Goldstein | 307/140 X |
| 4,484,040 | 11/1984 | Wasle | 200/38 |
| 4,570,216 | 2/1986 | Chan | 307/141.4 |

OTHER PUBLICATIONS

Auger et al (Auger), "Latching Relays", *The Relay Guide*, Reinhold Publishing Corp., 1960, pp. 209–211.

*Primary Examiner*—Sharon D. Logan

[57] ABSTRACT

A plug-in timer has a set of input terminals and a set of output terminals as well as a contactor operable to make and/or break electrical connection between these sets of terminals in accordance with a pre-setable 24 hour program. The timer is powered from a small built-in battery, and comprises its own quartz clock and programming-and-control means. The contactor is actuated by a miniature DC motor through a gear and cam arrangement. The operation of the DC motor is controlled by the programming-and-control means, which provides power from the battery to the motor in accordance with a pre-set program; which pre-set program may be modified at any time by way of a keyboard and a numeric display means.

The contactor operates by way of hard metal contacts and very little power dissipation occurs within the timer. The timer can be plugged into a special wall switch receptacle and then operates to programmably control the flow of power to the load controlled by this wall switch.

Since the timer has its own built-in source of energy and clock, its operation is totally independent of the power line, and it will therefore not be affected by a power failure. With a usage rate of two CONNECT-actuations and two DISCONNECT-actuations per day, plus occasional over-rides, the battery will last for years before needing replacement.

18 Claims, 2 Drawing Sheets

PROGRAMMABLE WALL SWITCH PLUG-IN TIMER

CROSS REFERENCE TO PRIOR APPLICATIONS

The present application is a continuation under 37 C.F.R. 1.62 of Ser. No. 07/420,695, filed Oct. 11, 1989, now abandoned, which is a continuation under 37 C.F.R. 1.62 of Ser. No. 06/728,678, filed Apr. 29, 1985, now abandoned.

BACKGROUND OF THE INVENTION

1. Field of Invention

The present invention relates to an electronic programable wall switch timer for use in lieu of an ordinary wall switch, thereby to provide for programable control of the power provided to the load normally controlled from this wall switch.

2. Prior Art

A couple of types of electronic programmable wall switch timers are available for purchase, and many more types have been described in various publications. The most commonly used type is described in U.S. Pat. No. RE 31,848 to Nilssen.

However, each one of these electronic wall switch timers has at least two significantly limiting characteristics: i) the use of a thyristor for controlling the flow of power, and ii) the use of the 60 Hz power line voltage for providing the requisite accurate time base for the programing means.

One limitation associated with the use of a thyristor in a wall switch timer relates to one of the thyristor's likely failure modes, namely the one in which the thyristor changes to become a rectifier. This likely failure mode makes it hard to obtain U.L. listing for a thyristor-based wall switch timer to be used for loads other than incandescent lamps.

Another limitation associated with the use of a thyristor involves inefficiency: because of the relatively large amount of power dissipation occurring within a thyristor, it is necessary that it be used with a heat sink; which results in significant limitations of the design freedom associated with any timer using a thyristor for power switching.

The main limitation associated with using the 60 Hz power line voltage as the basis for keeping accurate track of time is that of losing timing and/or accuracy of programming as a result of load failure or removal, or due to power failure.

SUMMARY OF THE INVENTION

Brief Description

In its preferred embodiment, subject invention comprises a self-contained programmable plug-in timer having a pair of plug terminals and a mechanical contactor means operable to make and/or break electrical connection between these terminals in accordance with a presetable 24-hour program.

The timer is powered from a small built-in battery, and comprises its own quartz clock and clock-based programming-and-control means. The contactor is actuated by a miniature DC motor through a gear and cam arrangement. The operation of the DC motor is controlled by the programming-and-control means, which provides power from the battery to the motor in accordance with a pre-set program. To provide for accurate positioning of the cam, thereby to achieve proper operation of the contactors, a cam position sensing means is used to provide position control information to the programming-and-control means.

The pre-set program may be modified at any time by way of a keyboard and an electronic numeric display means. When not being used for programming, the display means shows current time-of-day.

The timer has special plug means and may be plugged into a special electrical receptacle; which special receptacle is placed in the wall switch box in lieu of the ordinary wall switch in such a way that the timer may be plugged into this receptacle by way of the aperture of a standard wall switch cover plate. The special plug means is so constituted as to be prevented from being plugged into an ordinary household electric receptacle.

Since the electrical connection made by the contactor is made by way of hard metal contacts, very little power dissipation takes place within the timer, and the amount of power that the timer can safely control is therefore relatively large.

Since the timer has its own built-in source of energy and accurate clock, its operation is totally independent of the power line and will therefore not be affected by a power failure—however long.

Based on an anticipated usage rate of two ON-actuations and two OFF-actuations per day, plus occasional over-rides, the battery will last for years before needing replacement.

BRIEF DESCRIPTION OF THE DRAWINGS

FIG. 1*a* shows a view predominantly from the rear; and FIG. 1*b* shows a view predominantly from the front.

DESCRIPTION OF THE PREFERRED EMBODIMENT

Details of Construction

FIG. 1*a* shows a view predominantly from the rear of the programmable timer T. Positioned substantially in the middle of the rear of timer T is a pair .of prongs P1 and P2 operable to be plugged into and to be held by a special electrical receptacle. On the side of the timer is shown a cut-out switch COS operable to be positioned in an A-position (shown) or in a B-position.

FIG. 1*b* shows a view predominantly from the front of the timer. Positioned near the top of the front is a numeric display means NDM. Positioned below this display means are two relatively large-size program over-ride keys PORK1 and PORK2; and below these over-ride keys is located a set of nine calculator-type programming keys PK1 to PK9.

Figure 2:
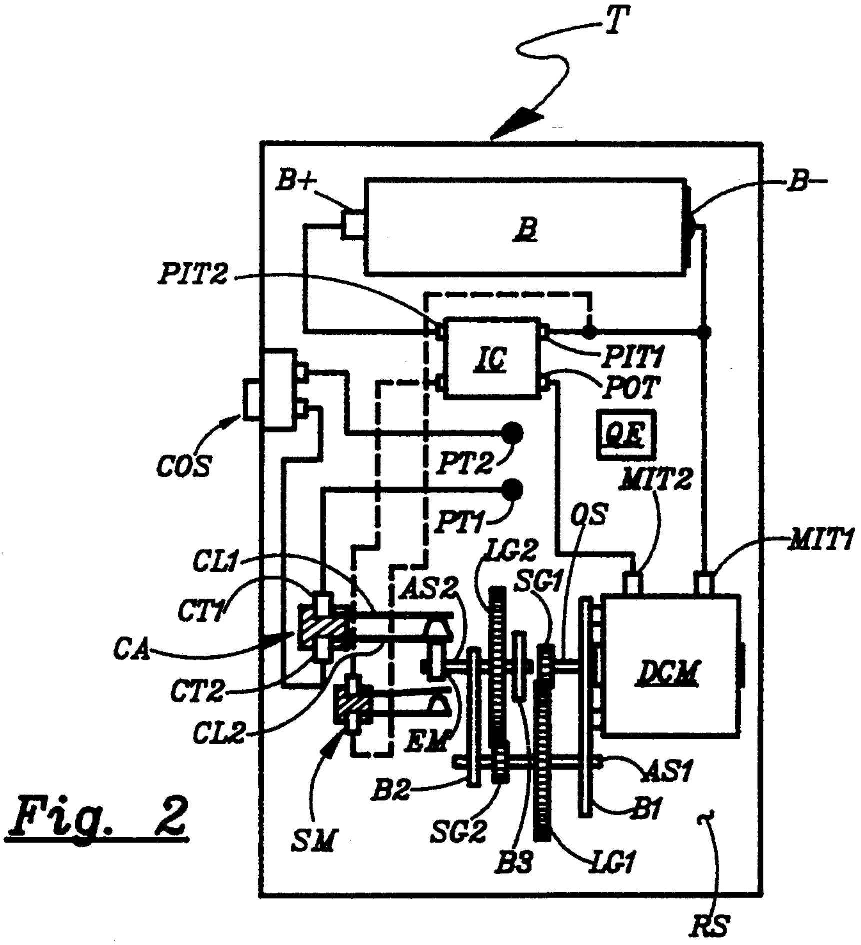
FIG. 2 represents a frontal view of the key components comprised within the timer.

FIG. 2 shows a schematic frontal view of the inside of the timer. A miniature DC motor DCM has two electrical power input terminals MIT1 and MIT2 and is mounted onto a first bracket B1 that is fastened to rear surface RS. On the output shaft OS of this DC motor is mounted a first small gear SG1. This first small gear SG1 is engaged with a first large gear LG1; which first large gear is mounted on a first auxiliary shaft AS1 that is rotatably mounted between first bracket B1 and a second bracket B2 that is also fastened to rear surface RS. Also mounted onto auxiliary shaft AS1 is a second small gear SG2.

Second small gear SG2 is engaged with a second large gear LG2 mounted on a second auxiliary shaft AS2; which second auxiliary shaft is rotatably mounted between second bracket B2 and a third bracket B3, also fastened onto rear surface RS.

Mounted onto an extension of second auxiliary shaft AS2 is a cam or an eccentric means EM that operates a contactor assembly CA that consists of a first contactor lever CL1 and a second contactor lever CL2. Eccentric means EM, which is made of electrically non-conductive material, is shown in a position wherein it causes first contactor lever CL1 to come into contact with second contactor lever CL2.

Eccentric means EM also operates a switch means SM, which is located in a position on the other side of eccentric means EM as compared with the location of contactor assembly CA.

As output shaft OS rotates, contactor lever CL1 makes contact with contactor lever CL2 one time for each revolution of eccentric means EM. Similarly, switch means SM is actuated once for each revolution of eccentric means EM.

Contactor assembly CA has two contactor terminals CT1 and CT2. Terminal CT1 is electrically connected with a prong terminal PT1 of prong P1, and terminal CT2 is electrically connected with a prong terminal PT2 of prong P2 by way of cut-out switch COS.

Switch means SM also has two contactor terminals, both of which are connected with an integrated circuit IC.

A battery B has a B− terminal and a B+ terminal, with the B− terminal being of negative polarity with respect to the B+ terminal. The B− terminal is electrically connected with motor input terminal MIT1 and with IC power input terminal PIT 1; the B+ terminal is connected with IC power input terminal PIT2.

Integrated circuit IC and a quartz element QE are located below battery B—in a position that would be relatively close to the numeric display means NDM of FIG. 1*b* . This IC has a relatively large number of electrical terminals, most of which are connected with the quartz element QE, the numeric display means NDM, the programming keys PK1 to PK9, and the program-over-ride keys PORK1 and PORK2. However, for sake of clarity, and also since they form no part of the present invention, the detailed electrical connections between the IC and QE, NDM, PK1 to PK9, PORK1 and PORK2 are not shown.

The detailed design and construction of a programmable clock means based on a quartz-controlled IC and an electronic numeric display means is well known from prior art.

The remaining IC electrical terminals and connections are shown: electrical power input terminal PIT1 is electrically connected with battery terminal B−; electrical power input terminal PIT2 is electrically connected with battery terminal B+; electrical power output terminal POT is electrically connected with motor input terminal MIT2; the two terminals of switch means SM is connected with two terminals on the IC, one of which is the PIT1 terminal and the other one of which is a control input terminal.

To permit the size and shape of the timer to be as compact as desired, it is important that the individual components comprised within the timer be fittingly small. In practical reality, this concern is only important in respect to the battery and the motor.

Thus, the electrical power required to be supplied from the built-in battery must be modest enough to permit this battery to be small enough to reasonably fit within the desired specified dimensions of the timer. Similarly, the mechanical power required to be supplied by the built-in motor must be modest enough to permit this motor to be small enough to reasonably fit within the specified dimensions.

Since a certain amount Of energy is required to effect proper actuation of the contactor assembly, the power required is inversely proportional to the time allowed to effect this actuation. Thus, by way of a speed-reducing gear mechanism, it becomes possible to actuate the control lever at an arbitrarily small power level.

By allowing complete actuation of the contactor assembly, from its full-contact or fully-ON position to its no-contact or fully-OFF position, to take about one second from start to finish, the motor power output requirement gets to be acceptably modest; and actuation can then readily be accomplished by way of a substantially conventional miniature DC motor of dimensions no larger than 10 mm×20 mm×20 mm. Correspondingly, the electrical power required by the motor now becomes adequately modest to permit the use of a single ordinary AAA-cell for the built-in battery.

Figure 3:
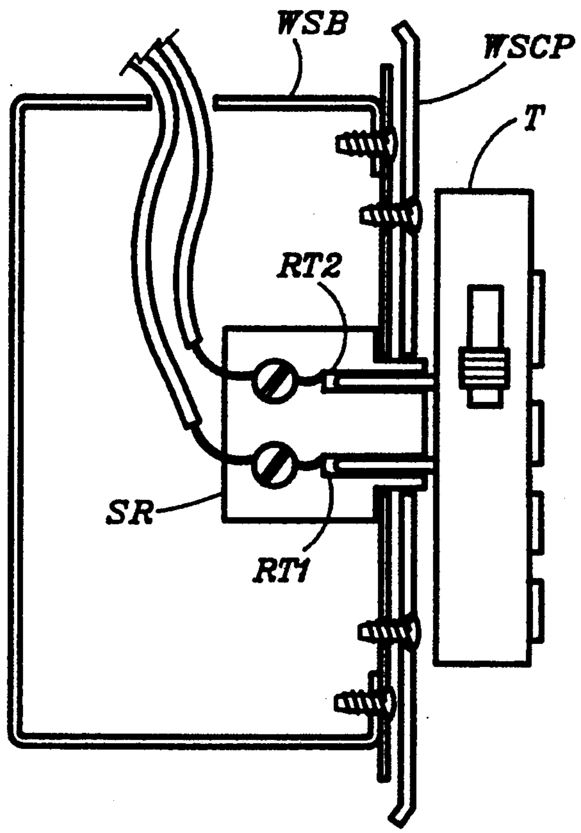
FIG. 3 shows a cross-sectional side-view of a wall switch box having a special receptacle means and with the timer plugged into this receptacle means.

FIG. 3 shows a pseudo-cross-sectional view of timer T plugged into a special receptacle SR mounted in lieu of an ordinary wall switch on a wall switch box WSB. The special receptacle has two receptacle terminals RT1 and RT2, which receptacle terminals are connected with the two wires that otherwise would have been connected with an ordinary wall switch. The receptacle terminals are accessible from outside of the wall switch box by way of the central aperture in an ordinary wall switch cover plate WSCP.

Details of Operation

Figure 1:
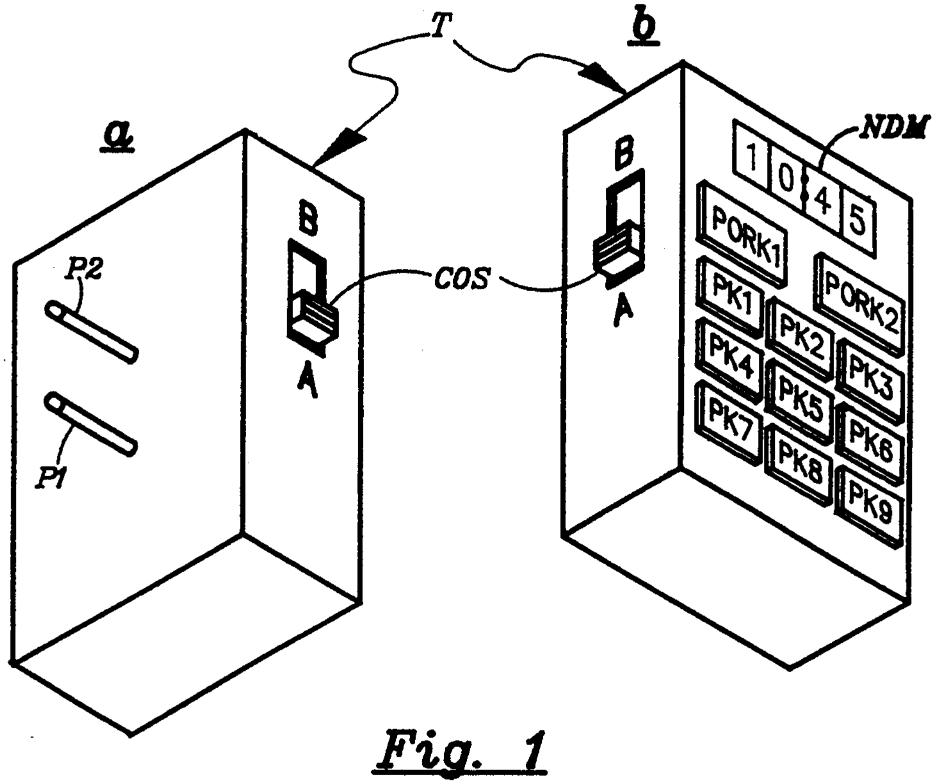
FIG. 1 shows the programmable wall switch plug-in timer in two perspective views.

With reference to FIGS. 1, 2 and 3, the overall operation of the timer may be explained as follows.

The timer may be programmed by way of programming keys K1 to K9 to cause the IC to actuate and/or de-actuate the DC motor in such a way as to cause contactor assembly CA to make and/or break electrical contact between contact terminals CT1 and CT2, and thereby between prong terminals PT1 and PT2 (as long as cut-out switch COS is in its closed position, which is the position marked by the letter A), in accordance with a desired time pattern; which time pattern will then automatically repeat every 24-hour period.

Thus, if the timer is plugged into the special receptacle in wall switch box WSB, the load connected with the wires entering this wall switch box will be connected and/or disconnected in accordance with the desired time pattern; which implies that the power provided to the load being connected with the two wires entering the wall switch box will be correspondingly controlled.

With reference to FIG. 2, when the DC motor is provided with a DC voltage across its electrical input terminals, the motor's output shaft will rotate. The rotating motor shaft will, by way of the indicated gear train, cause eccentric means EM to rotate, thereby actuating contactor assembly CA, as well as switch means SM, once for each revolution of EM. At a first point during each revolution, just before contactor lever CL1 is about to make electrical connection with contactor lever CL2, switch means SM opens; at a second point during each revolution, just before contactor lever CL1 is about to provide for electrical disconnection from contactor lever CL2, switch means SM closes. Each time switch means SM opens or closes, it provides a command to the IC to discontinue providing power to the motor.

Programming of the timer is accomplished as follows.

a) Current time-of-day is programmed into the clock by first momentarily depressing PK3, and then by depressing the hour-roll key PK1 and the minute-roll key PK2 until the correct hour and minute are displayed on the numeric display means NDM. After correct current time-of-day is reached, PK3 is depressed once more, thereby securing the time-of-day setting.

b) A first time-of-day for the load to be switched ON is established by: i) momentarily depressing PK4; ii) by way of PK1 and PK2, selecting the first desired time-of-day at which the load should be turned ON; and iii) momentarily depressing PK4 again, thereby securing this particular instruction.

c) A first time-of-day for the load to be switched OFF is established by: i) momentarily depressing PK5; ii) by way of PK1 and PK2, selecting the first desired time-of-day at which the load should be turned OFF; and iii) momentarily depressing PK5 again, thereby securing this particular instruction.

d) A second time-of-day for the load to be switched ON and a second time-of-day for the load to be switched OFF can be programmed into the timer by way of the PK6 key and the PK7 key, respectively, in the same manner as described above relative to the PK4 key and the PK5 key.

e) The PK8 key and the PK9 key may be used for providing various effects relating to time-variability of the keyed-in program. However, these effects have no relationship with the present invention.

f) During the process of selecting a given time-of-day for an ON-switching or an OFF-switching to occur, the numeric display means provides for a display of the time-of-day being selected. After the selection has been accomplished and secured, however, the numeric display means reverts back to displaying current time-of-day.

g) The PORK1 key and the PORK2 key are permanently programmed. After depressing the PORK1 key, the timer will be in the ON-state, regardless of the state in which it previously existed; after depressing the PORK2 key, the timer will be in its OFF-state, regardless of the state in which it previously existed.

Otherwise, the following details with respect to the timer's operation should be noted.

h) The positioning of switch means SM relative to eccentric means EM is important, not only to achieve accuracy in the actuation of contactor assembly CA, but also for the purpose of minimizing actuation time. Ideally, switching of the load should occur immediately upon command. Yet, due to the limited speed/power of the DC motor, a certain time is required to effect actuation of the contactor assembly. By positioning switch means SM optimally, actuation time can be made acceptably brief.

i) In its preferred embodiment, subject timer has a built-in 24-hour cycle; which is to say that whatever switching control pattern that is programmed into this timer will automatically repeat every 24 hours. However, it is readily possible to provide for other programming periods. For instance, in many cases a seven-day cycle would be advantageous.

It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:

housing means;

two electrical prongs protruding from the housing means and operable to be plugged into an electrical receptacle means;

electrical switch means disposed within the housing means and connected with the electrical prongs; the electrical switch means including: (i) an electric motor; (ii) a battery connected with the electric motor by way of a programming means; and (iii) contactor means connected with the electrical prongs and actuated by the electric motor such as to cause electrical connection and disconnection between the electrical prongs as a function of a program programmed into the programming means;

the electric motor being powered only during periods when it is operative to actuate the contactor means.

2. An arrangement comprising:

housing means;

two electrical prongs protruding from the housing means and operable to be plugged into an electrical receptacle means; and programmable switch means disposed within the housing means and connected with the electrical prongs; the programmable switch means including in inter-connected combination: (i) contactor means actuatable by being supplied with electric power; (ii) battery means; (iii) clock means characterized by including a quartz element; and (iv) programming means; the programming means being operable, on basis of accurate clock signal obtained from the clock means, to programmably cause an electrical short circuit and an electrical open circuit alternatingly and periodically to be placed between the electrical prongs; the programmable switch means being further characterized by causing electric power to be supplied to the contactor means in an intermittent manner and only for a brief period each time the contactor means is being actuated.

3. An arrangement comprising:

a wall switch box having a first opening and a second opening; a first pair of conductors coming into the wall switch box through the first opening;

a wall switch cover plate being mounted onto the wall switch box in such manner as to substantially cover the second opening; the wall switch cover plate having an aperture; the aperture being positioned in the center of the wall switch cover plate; and programmable timer located outside of the wall switch box; the timer having a second pair of conductors; the second pair of conductors being disconnectably connected with the first pair of conductors by way of the aperture; the timer including an electrically actuatable switch connected between the second pair of conductors and actuatable by being supplied with an actuating voltage; the timer being operative, by way of the electrically actuatable switch and in accordance with a desired time pattern, to cause an effective short circuit to occur from time to time between the second pair of conductors, thereby correspondingly to cause an effective short circuit to occur between the first pair of conductors; the timer being further characterized by supplying said actuating voltage to the electrically actuatable switch in an intermittent manner.

4. The arrangement of claim 3 further characterized by being fully functional without having more than two conductors penetrating through the aperture.

5. The arrangement of claim 3 further characterized by being fully functional even if having only two conductors penetrating through the aperture.

6. The arrangement of claim 3 wherein the timer is additionally characterized by including a clock function deriving its timing from a quartz element.

7. The arrangement of claim 3 wherein the timer is additionally characterized by including a quartz element functional to provide an accurate clock function.

8. The arrangement of claim 3 wherein: (i) the first pair of conductors is connected in circuit with the AC voltage of an ordinary electric utility power line; and (ii) the timer is additionally characterized by including a quartz element functional to provide an accurate clock function.

9. An arrangement comprising:

a wall switch box having a first relatively small opening and a second relatively large opening; a pair of first conductors coming into the wall switch box by way of the first opening;

a wall switch cover plate being mounted onto the wall switch box in such manner as to substantially cover the second relatively large opening; the wall switch cover plate having an aperture; the aperture being located in the center of the wall switch cover plate; and a timer positioned outside of the wall switch box; the timer having a pair of second conductors; the pair of second conductors protruding through the aperture and being operative to connect with the pair of first conductors; the timer being functional, in accordance with a desired time pattern, to alternatingly cause a short and an open circuit to occur between the pair of second conductors; thereby, correspondingly, to cause a short circuit and an open circuit to occur between the pair of first conductors; the timer being characterized by: (i) including an electrically actuatable switch having a pair of switch terminals connected between the pair of second conductors and actuatable by being provided with an actuation voltage between a pair of actuation terminals; (ii) from time to time, providing said actuation voltage at the actuation terminals; and (iii) including a quartz element.

10. The arrangement of claim 9 further characterized in that the electrically actuatable switch includes an electromagnetic actuator means.

11. The arrangement of claim 10 wherein the electromagnetic actuator means includes an electric motor.

12. The arrangement of claim 9 further characterized in that said actuation signal is provided only intermittently.

13. An arrangement comprising:

a wall switch box having a first relatively small opening and a second relatively large opening; a pair of first conductors coming into the wall switch box through the first opening;

a wall switch cover plate being mounted onto the wall switch box in such manner as to substantially cover the second relatively large opening; the wall switch cover plate having an aperture located in the center thereof; and a timer positioned outside of the wall switch box; the timer including (i) a pair of second conductors, (ii) an electrically actuatable switch connected with the pair of second conductors and operable to provide a short circuit therebetween in response to being supplied with an actuation voltage, and (iii) an accurate electronic clock means having a quartz element to help establish an accurate clock signal; the pair of second conductors protruding through the aperture and being connected with the pair of first conductors; the timer being functional, by supplying said actuation voltage in an intermittent manner, to intermittently cause a short circuit to occur between the pair of second conductors; thereby, correspondingly, to cause a short circuit to occur between the pair of first conductors.

14. The arrangement of claim 13 wherein the timer is further characterized by also including a battery having a battery terminal connected with one of the second conductors via an electrically conductive path.

15. An arrangement comprising:

a pair of electrical prongs adapted to be plugged into an electrical receptacle, thereby to make contact with a pair of receptacle terminals;

electrically actuatable contactor having a pair of contactor terminals connected with the electrical prongs and being operable to exist in either of two states: (i) a state wherein electric current is permitted to flow freely between the contactor terminals, and (ii) a state wherein electric current is prevented from flowing freely between the contactor terminals; the contactor means being operable at any given time, on receipt of an electrical actuation input, to change from one of said states to the other of said states, regardless of the nature of the particular state in which it exists at said given time;

energy means operative to supply electric power without having to be connected with an electric utility power line;

clock means connected with the energy means and operable to provide an accurate clock signal; the clock means having a quartz element for keeping accurate time; and programming means connected with the battery and with the clock means; the programming means being operative to provide said electrical actuation input repeatedly in accordance with a presetable program referenced to time-of-day.

16. Programmable switching means adapted to plug into and connect with a pair of receptacle terminals of an electrical receptacle, comprising:

plug means having a pair of electrical prongs adapted to be plugged into said electrical receptacle and to make contact with said receptacle terminals; and electrically actuatable contactor having a pair of contactor terminals connected with the electrical prongs and being operable to make or break electrical connection therebetween by being supplied with an actuation voltage at an actuation input; the electrically actuatable contactor being further characterized by including: (i) energy means operable to provide a DC voltage; and (ii) programming means connected with the energy means as well as with the actuation input, the programming means having clock means and being operative to provide the actuation voltage in accordance with a presetable program referenced to time-of day, such that the actuation voltage is provided to the actuation input only intermittently.

17. An arrangement comprising:

housing means;

two electrical prongs protruding from the housing means and operable to be plugged into an electrical receptacle; and a programmable electrical switch disposed within the housing means and connected in circuit with the electrical prongs; the programmable electrical switch being characterized by including: (i) a contactor means actuatable by being supplied with an actuation voltage on an actuation input; and (ii) a programming means connected in circuit with the actuation input and operable to provide the actuation voltage thereto in an intermittent manner;

whereby the programmable electrical switch is functional to cause AC power line voltage to be applied to a load in a programmed manner.

18. An arrangement comprising:

housing means;

two electrical prongs protruding from the housing means and operable to be plugged into an electrical receptacle; and an electrically actuatable switch disposed within the housing means and connected in circuit with the electrical prongs; the switch including: (i) metal-to-metal contactors; (ii) actuation terminals; and (iii) programmable actuation means connected with the actuation terminals and operative, but only intermittently, to provide an actuation voltage thereto.

* * * * *